No. 693,837. Patented Feb. 25, 1902.
W. E. CANEDY.
MOTOR GEARING.
(Application filed Dec. 11, 1901.)
(No Model.)
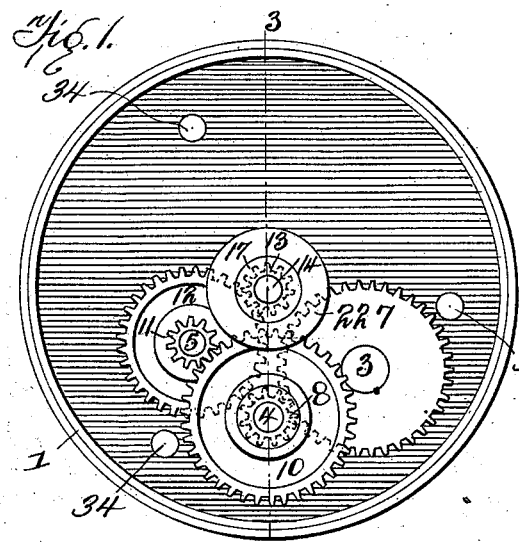
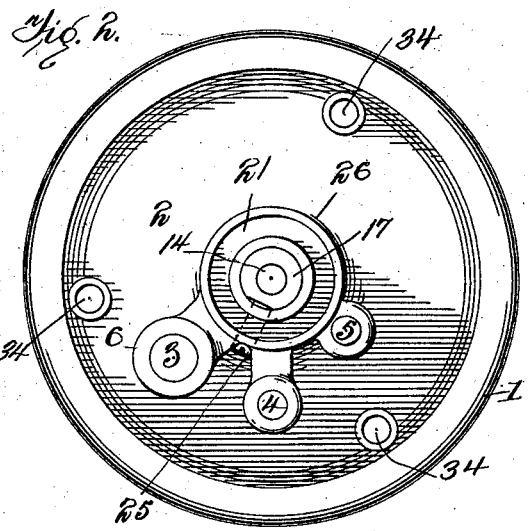
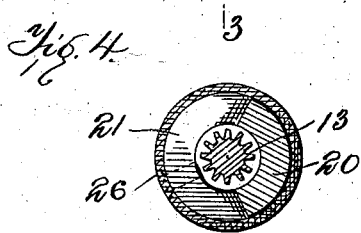
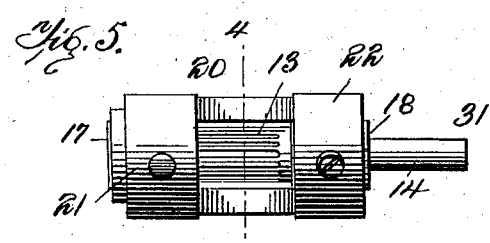
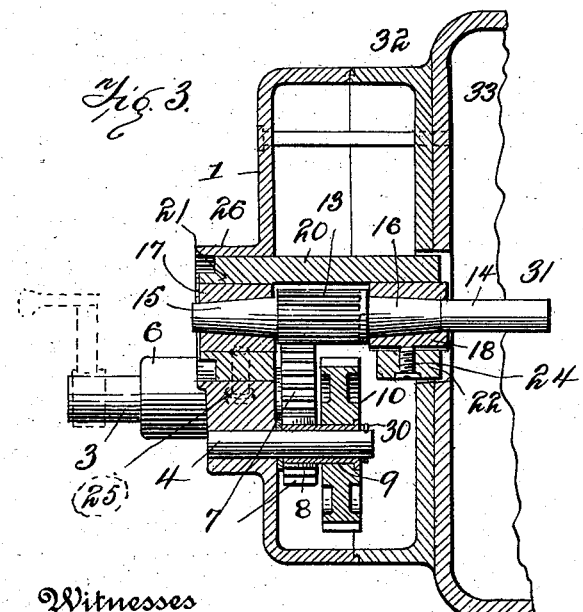
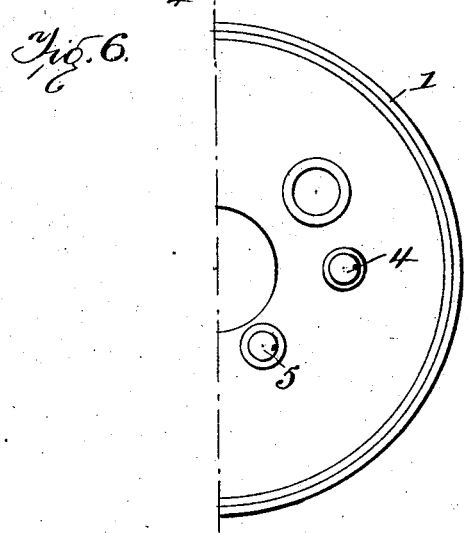
Witnesses
Chas. K. Davies.
M. E. Brown
Inventor
W. E. Canedy
by W. A. Bartlett
Attorney
THE NORRIS PETERS CO., PHOTO-LITHO., WASHINGTON, D. C.

UNITED STATES PATENT OFFICE.

WILLIAM E. CANEDY, OF CHICAGO HEIGHTS, ILLINOIS, ASSIGNOR TO THE CANEDY OTTO MANUFACTURING COMPANY, A CORPORATION OF ILLINOIS.

MOTOR-GEARING.

SPECIFICATION forming part of Letters Patent No. 693,837, dated February 25, 1902.

Application filed December 11, 1901. Serial No. 85,524. (No model.)

*To all whom it may concern:*

Be it known that I, WILLIAM E. CANEDY, residing at Chicago Heights, in the county of Cook and State of Illinois, have invented certain new and useful Improvements in Motor-Gearing, of which the following is a specification, reference being had therein to the accompanying drawings.

This invention relates to motor-gearing for rotary blowers and other machines requiring rotary motion.

The object of the invention is to so improve the bearings and gear-supports of machines of this character that the main shaft-bearings shall be kept in true alinement independently of exact casing-support, so that the parts may run smoothly and with a minimum of noise and loss by friction; also, to improve construction for taking up wear and for assembling the parts in a casing.

Figure 1 is an elevation looking toward the gears in the casing-section which supports the pinions. Fig. 2 is a reverse view of the casing-section. Fig. 3 is a vertical section on line 3 3 of Fig. 1, showing also the other casing-section and blower-casing. Fig. 4 is a section of sleeve, main shaft, and bearings on line 4 4 of Fig. 5; and Fig. 5 is a plan of the same parts. Fig. 6 is an inside view of a part of the casing with gears removed.

The cylindrical casing-section 1, in which the gears are inclosed, is a shallow box, preferably of cast metal of usual construction and having a head 2, in which the axles or pintles 3 4 5 of the gear-wheels are supported. The axle or shaft 3 is supported in a bearing-hub 6 and is the driving-shaft, to which power is conveyed by hand or mechanism. On shaft 3 the pinion 7 is rigidly secured in position to gear with pinion 8, which pinion 8 is integral with or rigid with a sleeve 9 and also with pinion 10, the pintle 4 forming an axis for said sleeve and pinions. Pinion 10 engages gear 11, which is connected to gear 12, both being supported on pintle 5, and pinion 12 engages a gear 13 on the central shaft 14. As the general construction and arrangement of this train of gears is not new, it is deemed unnecessary to make extended description thereof, except as relates to further constructions deemed novel.

The shaft 14 has conical or tapered bearings 15 and 16 at opposite sides of the gear 13. Preferably the shaft, bearings, and gear are integral, and tapered bearings are ground with great exactness on the shaft to be exactly concentric with the shaft and gear. The gear-teeth are considerably longer than the teeth on pinion 12 to provide for adjustment and assemblage.

The frusto-conical bearings 15 and 16 are inclosed in bearing brasses or boxes 17 and 18, which internally fit neatly to the tapered sections of the shaft and externally are true concentric cylinders, except as they may be slightly flattened to afford seats for the retaining-screws to be described.

The brasses or boxes 17 and 18 are inclosed in the cylindrical end portions or thimbles of sleeve 20, which sleeve is a very important part of this invention.

The sleeve 20 is a perfectly cylindrical tube, having one side cut away for a little more than half the circumference, leaving the two thimbles 21 and 22 of about the same length as the boxes 17 and 18, which neatly fit within these thimbles. The boxes can be moved along in the thimbles of this sleeve until they accurately center and hold the tapered parts of the shaft with just such compression as permits the shaft to run easily and smoothly. One of the boxes or brasses is held by a set-screw 24 and the other by a set-screw 25 outside the casing, which screw 25 also holds the sleeve 20 to the casing. A flange or hub 26 outside the casing and having a socket bored concentric with the sleeve 20 receives the end of this sleeve. The box 17 can be set up from outside the casing to take up wear.

In assembling the sleeve 20, with the shaft and boxes or brasses inclosed, as in Fig. 5, can be entered from the inner face of the casing, the gears on the pintles 3 4 sliding on said pintles to permit assemblage. The gears are usually held in place on the pintles by keys, as 30.

The sleeve 20 holds the bearings of shaft 14 in line with each other, and the shaft is therefore to an extent independent of support at the end 31, which end carries the fan-blower, grinder, or other rapidly-revolving tool or machine. As indicated in Fig. 3, however, the inner end of sleeve 20 may be centered in the casing-section 32, which section may be attached to a blower-casing 33. In such case the casing-sections may be held together by bolts or screws passing through holes 34 and entering the casing-sections 32 33.

Owing perhaps to the inequality or yielding of the metal or perhaps for some other reason I have found it impossible to secure correct alinement of the bearings for such a shaft as shaft 14 if the same are held directly in the sections of the casing, as would be the case, for instance, were the brasses 17 and 18 enlarged, so as to fit apertures in the two sections of the casing; but, as has been stated, by supplying a sleeve 20 and making its main support that part of the casing which also supports the gears I have overcome difficulties heretofore existing and have secured a high-speed gear for small motors which runs with less friction and less noise than anything heretofore known to me.

Usually the casing has an oil-supply, so that the lower gear, as 10, lifts the oil, and the whole train is lubricated thereby, as is common.

The motor-gear operates with equal facility whichever be the direction of rotation and is available for driving a shaft, machine, or tool at a slow speed by connecting the power to shaft 14 and applying it through shaft 3.

What I claim is—

1. The combination with a casing-section and a train of driving-gears supported thereby, of a motor-shaft, a sleeve rigid with the casing-section and surrounding said shaft, said sleeve having a plurality of shaft-bearings therein, and a gear on the shaft between said bearings and engaging with the train.

2. The combination with a casing-section and a train of driving-gears supported thereby, of a sleeve rigid with the casing-section, tapered boxes within said sleeve, a shaft in the tapered boxes having tapered portions conforming thereto, and a gear on the shaft engaging with the train on the casing-section.

3. The cylindrical casing-section having a central socket, the detachable sleeve having thimbles at each end and a shaft with a bearing in each thimble, a gear on the shaft between said bearings, and a train of gears supported by the casing-section with which the gear on the shaft engages, all combined.

4. A casing consisting of two parts or sections, a sleeve rigidly held in one section and extending to the other section, a shaft having bearings near each end of said sleeve and a gear between, and a train of gears in operative engagement with the shaft-gear and supported by the casing-section which supports the sleeve, all combined substantially as described.

5. The sleeve 20 having a cut-away central portion and thimbles 21, 22 near the ends, boxes with tapered apertures within these thimbles, a shaft with tapered bearings in the boxes, and set-screws by which the boxes may be retained when adjusted to take up wear or for other purpose, all combined.

In testimony whereof I affix my signature in presence of two witnesses.

W. E. CANEDY.

Witnesses:
W. A. BARTLETT,
M. E. BROWN.